United States Patent
Hong

(10) Patent No.: US 12,490,163 B2
(45) Date of Patent: Dec. 2, 2025

(54) SATELLITE COMMUNICATION METHOD, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 435 days.

(21) Appl. No.: 18/013,739

(22) PCT Filed: Jul. 29, 2020

(86) PCT No.: PCT/CN2020/105448
§ 371 (c)(1),
(2) Date: Dec. 29, 2022

(87) PCT Pub. No.: WO2022/021126
PCT Pub. Date: Feb. 3, 2022

(65) Prior Publication Data
US 2023/0300699 A1    Sep. 21, 2023

(51) Int. Cl.
*H04W 36/08* (2009.01)
*H04W 36/30* (2009.01)
*H04W 84/06* (2009.01)

(52) U.S. Cl.
CPC .......... *H04W 36/08* (2013.01); *H04W 36/30* (2013.01); *H04W 84/06* (2013.01)

(58) Field of Classification Search
CPC .............................. H04W 36/00; H04W 48/00
See application file for complete search history.

(56) References Cited

U.S. PATENT DOCUMENTS

| 11,632,166 B2 * | 4/2023 | Lucky | H04B 7/185 370/319 |
| 2015/0237546 A1 * | 8/2015 | Lin | H04W 36/00835 455/436 |
| 2018/0213454 A1 * | 7/2018 | Santhanam | H04W 36/0085 |

FOREIGN PATENT DOCUMENTS

| CN | 103945478 A | 7/2014 | |
| CN | 108141277 A | 6/2018 | |
| CN | 110312216 A | 10/2019 | |
| CN | 111132254 A | 5/2020 | |
| WO | WO-2018076176 A1 * | 5/2018 | ........ H04W 36/0061 |
| WO | WO 2020092566 A1 | 5/2020 | |

OTHER PUBLICATIONS

PCT/CN2020/105448, English translation of International Search Report dated Apr. 30, 2021, 2 pages.
Chinese Patent Application 202080001693.X Office Action dated Mar. 22, 2024, 5 pages.
Chinese Patent Application 202080001693.X English translation of Office Action dated Mar. 22, 2024, 5 pages.
European Patent Application No. 20947424.6 Search and Opinion dated Apr. 22, 2024, 8 pages.

* cited by examiner

*Primary Examiner* — Shukri Taha
(74) *Attorney, Agent, or Firm* — Cozen O'Connor

(57) ABSTRACT

A satellite communication method, includes: receiving target information sent by at least one satellite; in which, the target information at least includes dwell time defining when cells of the at least one satellite dwells in one or more regions; and performing cell selection or cell reselection at least based on the target information.

20 Claims, 6 Drawing Sheets

SATELLITE COMMUNICATION METHOD, AND STORAGE MEDIUM

CROSS-REFERENCE TO RELATED APPLICATION

This application is a U.S. national phase of International Application No. PCT/CN2020/105448, filed on Jul. 29, 2020, the entire content of which is incorporated herein by reference.

FIELD

The present disclosure relates to a field of communication, specifically to a satellite communication method and apparatus, and a storage medium.

BACKGROUND

Space-air-ground-sea integration is a key communication technology. Space-air-ground-sea integration refers to an integrated high-speed broadband large-capacity information network, namely, a sky-based, space-based and land-based integrated comprehensive network, which can cover whole world by a constellation formed by multiple satellites in different orbits, of different types and with different performances, and can intensively combine users, aircrafts and various communication platforms on the ground, at sea, in the air and in the deep space through links between satellites and links between satellites and ground. By adopting intelligent high-speed on-board processing, switching and routing technologies, orienting to optical and infrared multispectral information, the integrated high-speed broadband large-capacity information network can perform accurate information acquisition, rapid processing and efficient transmission in accordance with a principle of maximum effective comprehensive utilization of information resources.

SUMMARY

According to a first aspect of embodiments of the present disclosure, a satellite communication method is provided. The method is performed by a user equipment, and the method includes:
receiving target information sent by at least one satellite; in which, the target information at least includes dwell time defining when cells of the at least one satellite dwell in one or more regions; and
performing cell selection or cell reselection at least based on the target information.

According to a second aspect of the present disclosure, a satellite communication method is provided. The method is performed by a satellite, and the method includes:
sending target information; in which, the target information at least includes dwell time defining when cells of the at least one satellite dwell in one or more regions.
Optionally, sending the target information includes:
broadcasting a first system message carrying the target information.

According to a third aspect of the present disclosure, a non-transitory computer-readable storage medium having computer programs stored thereon is provided. The computer programs are configured to perform the satellite communication method according to any of the first aspect.

According to a fourth aspect of the present disclosure, a user equipment is provided, and the user equipment includes:

a processor; and
a memory configured to store computer programs;
in which, the processor is configured to implement the computer programs to implement the satellite communication method according to any of the first aspect.

According to a fifth aspect of the present disclosure, a satellite s provided, and the satellite includes:
a processor; and
a memory configured to store computer programs;
in which, the processor is configured to implement the computer programs to implement the satellite communication method according to any of the second aspect.

It should be understood that the above general description and the following detailed description are only illustrative and explanatory, and do not limit the present disclosure.

BRIEF DESCRIPTION OF THE DRAWINGS

The drawings herein are incorporated into the specification and constitute a part of the specification, showing the embodiments conforming to the disclosure, and are used together with the specification to explain the principles of the embodiments of the disclosure.

DETAILED DESCRIPTION

Exemplary embodiments will be described in detail here, and their examples are shown in the accompanying drawings. When the following description refers to the drawings, unless otherwise indicated, the same number in different drawings indicates the same or similar elements. The implementations described in the following exemplary embodiments do not represent all implementations consistent with the embodiments of the disclosure. On the contrary, they are only examples of devices and methods consistent with some aspects of the embodiments of the disclosure as detailed in the appended claims.

The terms used in the embodiments of the present disclosure are only for the purpose of describing specific embodiments, and are not intended to limit the present disclosure. The singular forms of "one", "said" and "the" used in the present disclosure and the appended claims are also intended to include the majority forms, unless the context clearly indicates other meanings. It should also be understood that the terms "and/or" as used herein refer to and include any or all possible combinations of one or more associated listed items.

It should be understood that although the terms first, second, third, etc. may be used to describe various information in the present disclosure, such information should not be limited to these terms. These terms are only used to distinguish the same type of information from each other. For example, without departing from the scope of the present disclosure, the first information can also be called the second information, and similarly, the second information can also be called the first information. Depending on the context, the word "if" as used here can be interpreted as "when" or "while" or "in response to determining".

In a ground communication system, a user equipment selects an appropriate satellite for access according to signal quality of a base station when selecting or reselecting cells. A position of the base station is fixed and a coverage region of the base station is continuous. However, in the satellite communication system, the position of the satellite is mobile relative to the ground, resulting in a mobile coverage region of the satellite, and the coverage region is discontinuous due to a small number of satellites. So how to reasonably select cells or reselect cells in satellite communication systems is a problem to be solved.

Figure 1A:
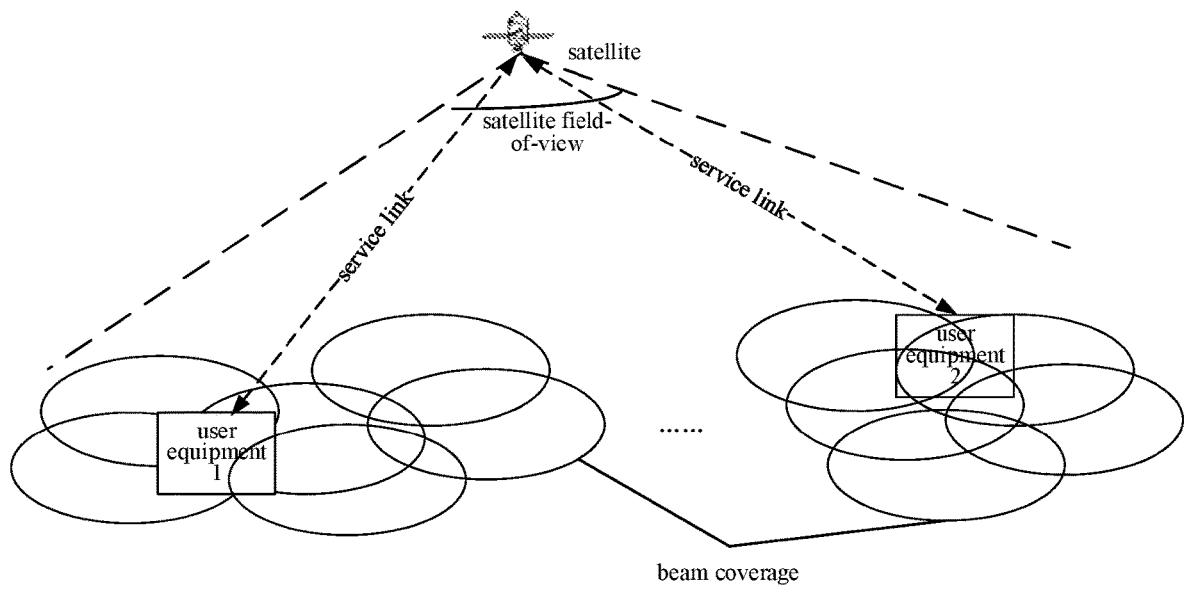
FIG. 1A is a schematic diagram illustrating a satellite communication scenario according to an exemplary embodiment.

In order to solve the above problem, the present disclosure provides a satellite communication solution, which can be used in a satellite communication scenario. The satellite communication scenario in the present disclosure includes but is not limited to a scenario shown in FIG. 1A, in which user equipments communicate with each other directly via the satellite, and a link between a user equipment and the satellite is called a service link.

Figure 1B:
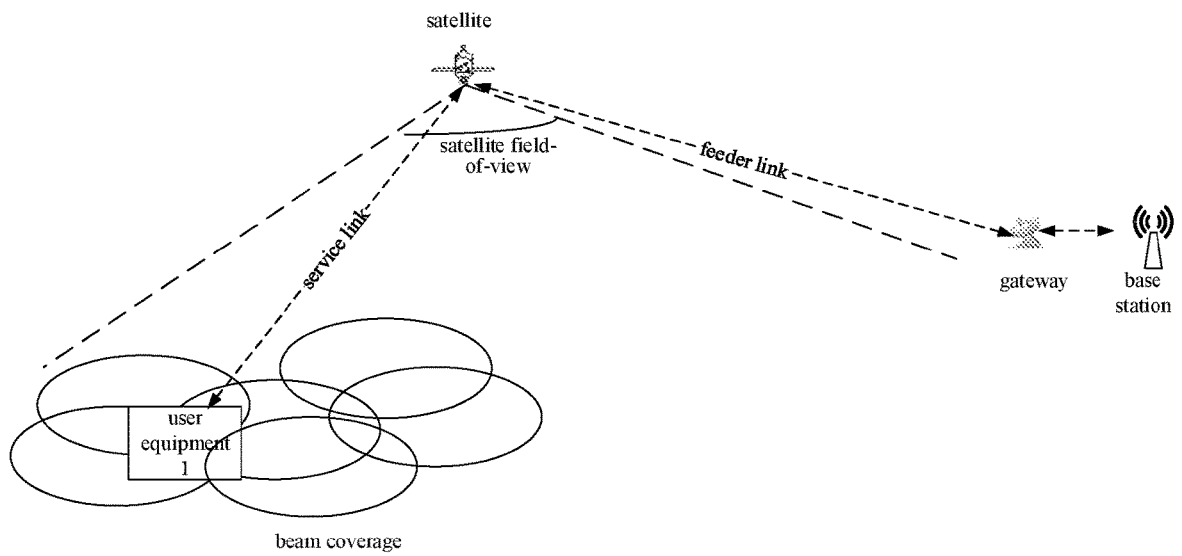
FIG. 1B is a schematic diagram illustrating a satellite communication scenario according to another exemplary embodiment.

Alternatively, the satellite communication scenario may include a scenario shown in FIG. 1B, after receiving signaling and/or information sent by the base station through a gateway, the satellite, as a relay, forwards the signaling and/or information to the user equipment. A direct link between the satellite and the user equipment is called a service link, and a link between the satellite and the gateway is called a feeder link. In the following, a satellite communication method provided by this disclosure is introduced from the user equipment side.

Figure 2:
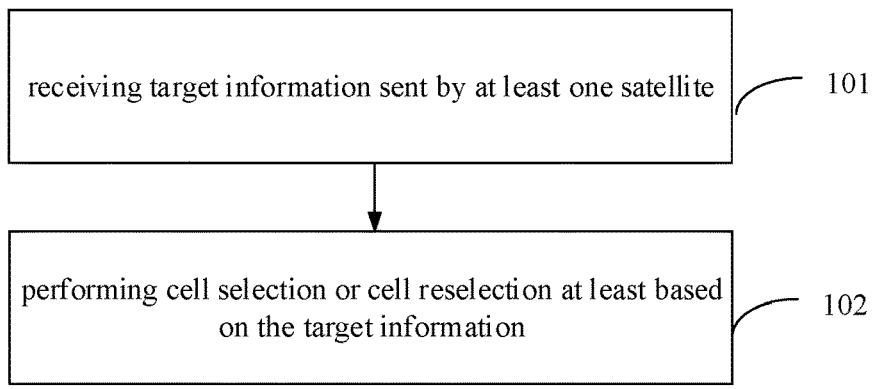
FIG. 2 is a flow chart of a satellite communication method in a user equipment according to an exemplary embodiment.

The embodiment of the present disclosure provides a satellite communication method, which is performed by a user equipment, such as a terminal, a personal assistant, a personal computer, etc. As illustrated in FIG. 2, which is a flow chart of a satellite communication method according to an embodiment. The method can include the following steps:

Step 101, target information sent by at least one satellite is received.

In an embodiment of the present disclosure, the target information at least includes dwell time defining when cells of the at least one satellite dwell in one or more regions.

For example, the target information can be implemented by a correspondence between region identifiers and dwell time defining when the satellite cells exist in one or more regions, the correspondence may be as shown in Table 1.

TABLE 1

| region identifier | dwell time |
|---|---|
| region 1 and region 2 | T1-T2 |
| region 3 | T3-T4 |
| . . . | . . . |

Step 102, cell selection or cell reselection is performed at least based on the target information.

In the above embodiments, the user equipment can receive the target information sent by the at least one satellite. The target information includes at least dwell time defining when cells of the at least one satellite dwell in one or more regions. Furthermore, the user equipment can perform cell selection or cell reselection at least based on the received target information. In an embodiment of the present disclosure, the user equipment realizes the purpose of cell selection or cell reselection based on the dwell time defining when cells of the at least one satellite dwell in one or more regions during satellite communication.

In an optional embodiment, for the above step 101, the user equipment can receive a first system message carrying the target information. The first system message is broadcast by the at least one satellite.

The first system message can include minimum SI (minimum system information) or other SI (other system information). Minimum SI is minimum system information required for a terminal to access the satellite. Other SI is system information other than the minimum SI.

The at least one satellite can periodically broadcast the minimum SI or other SI carrying the target information, so that the user equipment can receive the target information.

Figure 3:
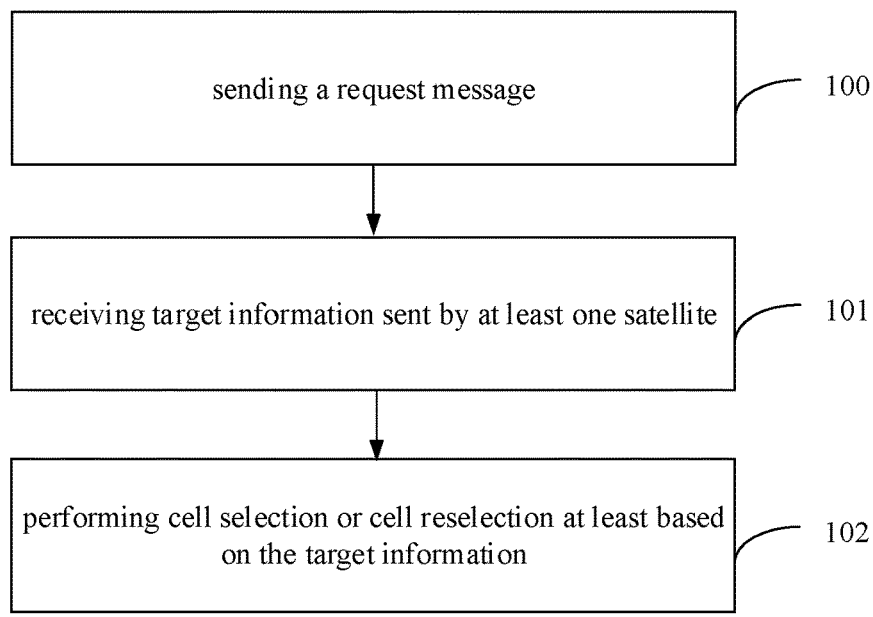
FIG. 3 is a flow chart of a satellite communication method in a user equipment according to another exemplary embodiment.

In an optional embodiment, as illustrated in FIG. 3, FIG. 3 is a flowchart of a satellite communication method according to an embodiment based on the embodiment shown in FIG. 2. The method may include following.

Step 100, a request message is sent.

The request message is configured to request to obtain the target information. Optionally, the request message can be a request message for requesting to obtain other SI.

Accordingly, step 101 may include following:

receiving a second system message carrying the target information, in which the second system message is sent by the at least one satellite to the user equipment through unicast signaling based on the request message; or receiving a second system message carrying the target information, in which the second system message is broadcast by the at least one satellite based on the request message.

In an embodiment of the present disclosure, when the satellite sends the target information to the user equipment, it can send the second system message carrying the target information to the user equipment through unicast signaling based on the above request message, and the user equipment can directly receive the second system message. Alternatively, after receiving the above request message from the user equipment, the satellite can broadcast the second system message carrying the target information based on the request message, and the user equipment can receive the second system message carrying the target information and periodically broadcast by the satellite.

In a condition where the user equipment sends a request message for requesting other SI, the second system message sent by the satellite is other SI.

In the above embodiments, the user equipment can receive the first system message carrying the target information broadcast by the at least one satellite. Alternatively, the user equipment can send the request message to request obtaining the target information. Further, the user equipment can receive the second system message carrying the target information sent by at least one satellite through unicast signaling based on the request message, or can receive the broadcast second system message carrying the target information. The purpose of receiving the target information sent by the at least one satellite is achieved, and subsequently, the user equipment can select cells or reselect cells according to the received target information, with high availability.

In an optional embodiment, the step 102 may include:

The cell selection or the cell reselection of the cells of the at least one satellite is performed at least based on a signal quality parameter and the target information.

In an embodiment of the present disclosure, the signal quality parameter is used to measure the signal quality of the cells of the satellite, including but not limited to RSRP (reference signal receiving power), RSRQ (reference signal receiving quality), and the like.

Figure 4:
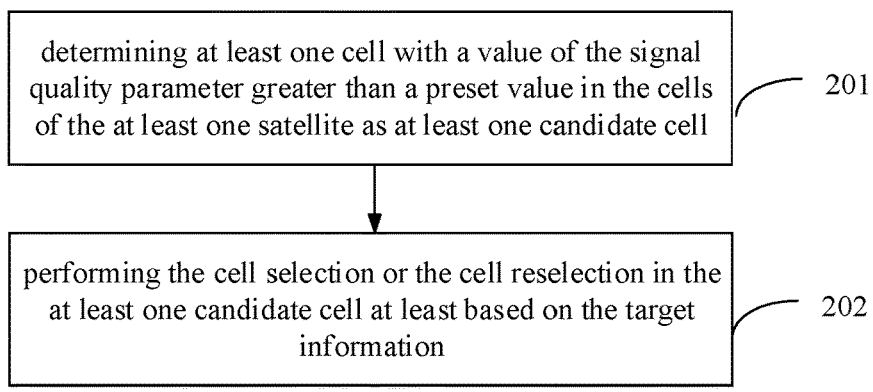
FIG. 4 is a flow chart of a satellite communication method in a user equipment according to another exemplary embodiment.

As illustrated in FIG. 4, FIG. is a flowchart of a satellite communication method according to an embodiment based on the embodiment shown in FIG. 2, step 102 may include the following.

Step 201, at least one cell with a value of the signal quality parameter greater than a preset value is determined from the cells of the at least one satellite as at least one candidate cell. In an embodiment of the present disclosure, the user equipment can respectively measure the values of the signal quality parameters corresponding to the at least one satellite. A cell whose value of the signal quality parameter value is greater than the preset value is selected, from the cells of the at least one satellite, as one candidate cell. That is, the cells with relatively high signal quality are selected as the candidate cells.

Step 202, the cell selection or the cell reselection of the at least one candidate cell is performed at least based on the target information.

In an embodiment of the present disclosure, the user equipment can perform cell selection or cell reselection in the at least one candidate cells with relatively high signal quality at least based on the target information.

In the above embodiments, the user equipment can select the cells whose signal quality parameter values are greater than the preset value as candidate cells from the cells of the at least one satellite. Further, in the candidate cells, cell selection or cell reselection is performed at least based on the target information, to ensure the communication quality.

Figure 5:
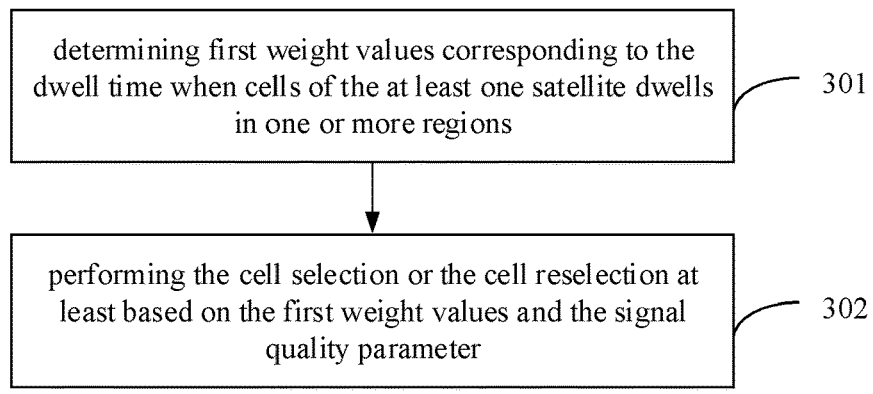
FIG. 5 is a flow chart of a satellite communication method in a user equipment according to another exemplary embodiment.

In an optional embodiment, as illustrated in FIG. 5, FIG. 5 is a flowchart of a satellite communication method according to an embodiment based on the embodiment shown in FIG. 2. The step 102 can include the following.

Step 301, first weight values corresponding to the dwell time defining when the cells of the at least one satellite dwell in one or more regions are determined.

In an embodiment of the present disclosure, the user equipment can determine the first weight values in any of the following ways.

In the first way, the first weight values broadcast by the at least one satellite are received.

In an embodiment of the present disclosure, for each of the at least one satellite, it can respectively configure a corresponding first weight value for dwell time defining when its cell dwell in the one or more regions, and the first weight value is sent to the user equipment in a form of broadcast signaling, and the user equipment receives the first weight value.

In the second way, the user equipment determines the first weight values according to the previously received target information.

For example, the user equipment can directly take dwell time defining when a satellite cell dwell in the one or more regions as a first weight value.

For another example, the closer a start time of dwelling in the one or more regions by a cell to the current time, the larger the first weight value may be.

For another example, the dwell time defining when the cells of the at least one satellite dwell in one or more regions can be normalized, and the normalized values obtained is taken as the first weight values.

Step 302, the cell selection or the cell reselection is performed at least based on the first weight values and the signal quality parameter.

In an embodiment of the present disclosure, the cell selection or the cell reselection can be performed at least according to the above first weight values and the signal quality parameter.

Figure 6:
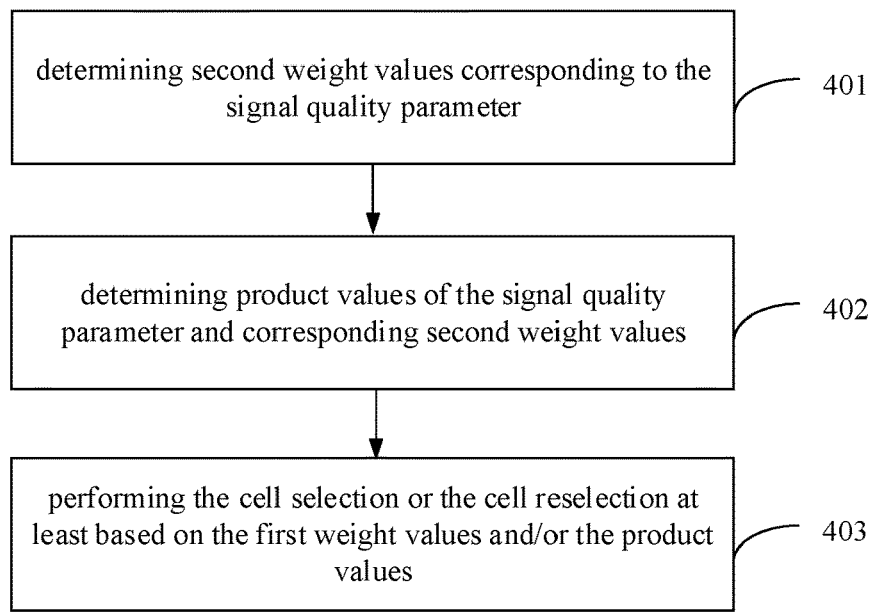
FIG. 6 is a flow chart of a satellite communication method in a user equipment according to another exemplary embodiment.

In an optional embodiment, as illustrated in FIG. 6, FIG. 6 is a flowchart of a satellite communication method according to an embodiment based on the embodiment shown in FIG. 5. Step 302 can include the following.

Step 401, second weight values corresponding to the signal quality parameter are determined.

In an embodiment of the present disclosure, the user equipment can set different second weight values for the signal quality parameter of different cells. Optionally, the higher a value of the signal quality parameter of a cell, the larger a corresponding second weight value is.

Step 402, product values of the signal quality parameter and corresponding second weight values are determined.

In an embodiment of the present disclosure, the values of the signal quality parameter of different cells can be multiplied by a corresponding second weight value to obtain the product values.

Step 403, the cell selection or the cell reselection is performed at least based on the first weight values and/or the product values.

In an embodiment of the present disclosure, when performing the cell selection or the cell reselection, a cell with a largest first weight value can be selected, that is, a cell with the longest dwell time can be selected, or a cell with a largest product value can be selected, that is, the cell with the best signal quality can be selected, or an optimal cell can be selected after comprehensively considering the signal quality and the dwell time.

In the above embodiments, the first weight values corresponding to the dwell time defining when the cells of the at least one satellite dwell in one or more regions can be determined, so that cell selection or cell reselection can be performed at least according to the first weight values and the signal quality parameter, with simple implementation and high availability.

In an optional embodiment, the above step 102 may include:

performing the cell selection or the cell reselection of the cells of the at least one satellite at least based on the signal quality parameter, the target information and at least one other parameter.

In an embodiment of the present disclosure, the at least one other parameter includes but is not limited to a moving speed parameter of the user equipment, a moving speed parameter of the satellite, a moving direction parameter of the user equipment, and a moving direction parameter of the satellite. The moving speed parameter and/or the moving direction parameter of the satellite can be sent to the user equipment by the satellite through broadcast signaling.

In an embodiment of the present disclosure, the cells of the at least one satellite can be sorted according to the signal quality parameter, the target information, and the at least one other parameter. When performing the cell selection or the cell reselection, the selection or reselection can be performed in an order from top to bottom.

The higher the value of the signal quality parameter, the more forward the corresponding cell is be sorted. Similarly, the longer the dwell time, the more forward the corresponding cell is be sorted. When the moving directions of the satellite and the user equipment is the same or the satellite and the user equipment moves to each other, the faster the satellite moves and/or the faster the user equipment moves, the more forward the corresponding cell is sorted.

In the above embodiments, the user equipment can also perform the cell selection or the cell reselection of the cells of the at least one satellite at least based on the signal quality parameter, the received target information, and the at least one other parameter, so that the user equipment can comprehensively consider the influence of various factors when selecting cells or reselecting cells, thus the final selected cell is more reasonable.

Further, a satellite communication method provided by the present disclosure is introduced from the satellite side. The embodiment of the present disclosure provides a satellite communication method, which is performed by a satellite. The method can include the following steps.

Step 501, target information is sent.

In an embodiment of the present disclosure, the target information at least includes dwell time defining when cells of the at least one satellite dwell in one or more regions.

In the above embodiments, the satellite can send the target information. The target information at least includes the dwell time defining when cells of the at least one satellite dwell in one or more regions. After receiving the target information sent by at least one satellite, the user equipment can perform cell selection or cell reselection based on the received target information, with high availability.

For the above step 501, in one example, the satellite can broadcast the target information to the user equipment through a first system message. The first system message can include minimum SI or other SI.

The satellite can broadcast the first system message carrying the target information according to a preset period, so that the user equipment can receive it.

In another example, the satellite can send the target information to at least one user equipment in response to a request message sent by the at least one user equipment.

In an embodiment of the present disclosure, the satellite can receive the request message sent by at least one user equipment for requesting to obtain the target information. The request message can be a request message for requesting other SI.

When the satellite sends the target information to the user equipment, it can send, through unicast signaling and based on the above request message, a second system message carrying the target information to the at least one user equipment that initiates the request.

Optionally, after receiving the above request message from the user equipment, the satellite can broadcast the second system message carrying the target information based on the request message.

If the user equipment sends the other SI request message, the second system message sent by the satellite is the other SI carrying the target information.

In the above embodiments, the satellite can broadcast the first system message carrying the target information, or the satellite can send the second system message carrying the target information to the user equipment through unicast signaling according to the request message sent by at least one user equipment, or the satellite can broadcast the second system message carrying the target information according to the request message sent by at least one user. In the disclosure, the target information is sent to the user equipment through system messages, so that the user equipment can select cells or reselect cells according to the target information.

Figure 7:
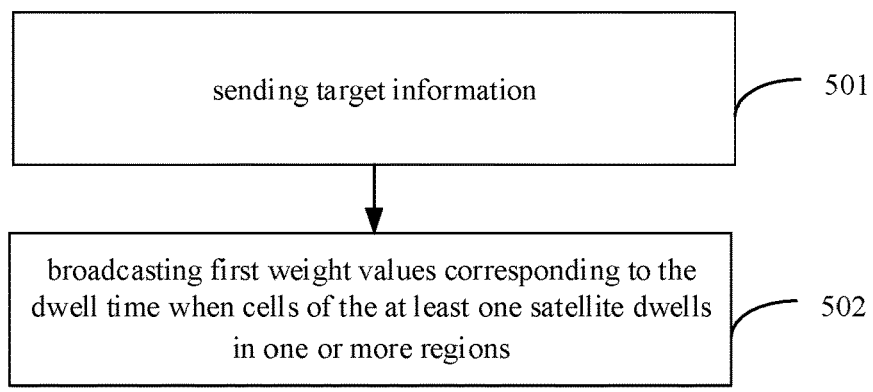
FIG. 7 is a flow chart of a satellite communication method in a satellite according to another exemplary embodiment.

In an optional embodiment, as illustrated to FIG. 7, FIG. 7 is a flow chart of a satellite communication method according to another embodiment. The method can include the following steps.

Step 502, first weight values corresponding to the dwell time defining when the cells of the at least one satellite dwell in one or more regions are broadcast.

In an embodiment of the present disclosure, the satellite can configure the corresponding first weight values according to the dwell time defining when cells of the at least one satellite dwell in one or more regions. Optionally, the longer the dwell time, the larger the first weight value may be. In one example, the dwell time can be taken as the first weight values. In another example, the closer a start time of dwelling in the one or more regions by a cell to the current time, the larger the first weight value may be. In another example, the dwell time can be normalized, and the normalized values obtained is taken as the first weight values.

Further, the satellite may broadcast the first weight values. So that the user equipment can subsequently perform the cell selection or the cell reselection at least according to the received first weight values and the signal quality parameter, with high availability.

In an optional embodiment, if the user equipment performs the cell selection or the cell reselection based on the first weight values and the signal quality parameter in combination with at least one other parameter, the satellite can also send a moving speed parameter and/or a moving direction parameter of the satellite in a broadcasting way, so that the user equipment can perform the cell selection or the cell reselection after comprehensive consideration after receiving.

Figure 8:
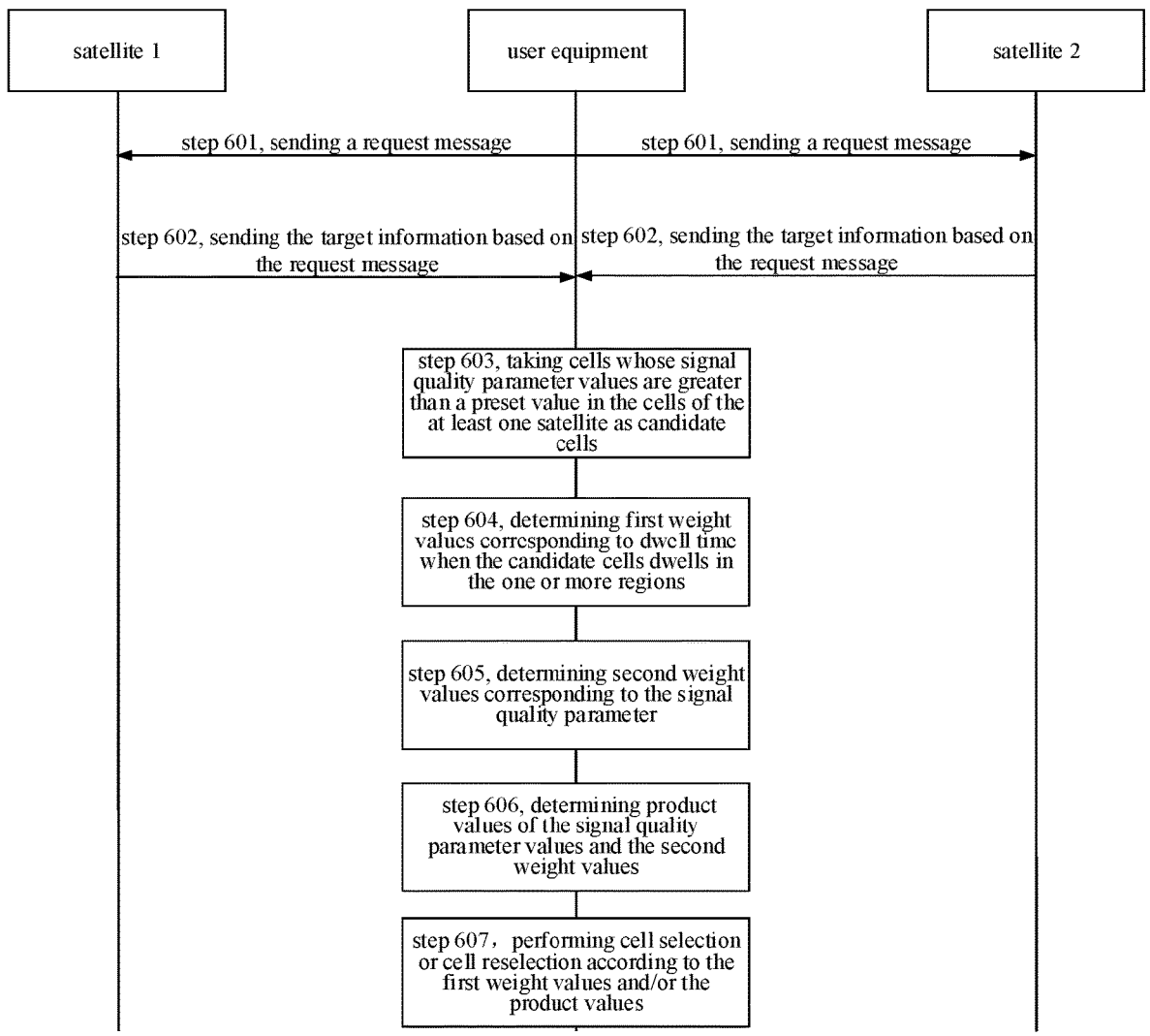
FIG. 8 is a flow chart of a satellite communication method according to another exemplary embodiment.

In an optional embodiment, with reference to FIG. 8, which is a flow chart of a satellite communication method according to an embodiment. In FIG. 8, the at least one satellite is explained only by taking Satellite 1 and Satellite 2 as an example. In practical application, the number of satellites can be more. The method can include the following steps.

Step 601, the user device sends a request message.

The request message is used to request to acquire target information of a satellite. The target information at least includes dwell time defining when cells of the at least one satellite dwell in one or more regions. The request message is a request message for requesting other SI.

Step 602, at least one satellite sends the target information based on the request message.

In an embodiment of the present disclosure, the satellite can send a second system message carrying the target information to the user equipment through unicast signaling, or can periodically broadcast the second system message carrying the target information. The second system message here is other SI.

Step 603, the user equipment takes cells whose signal quality parameter values are greater than a preset value of the cells of the at least one satellite as candidate cells.

Step 604, the user equipment determines first weight values corresponding to dwell time defining when the candidate cells dwell in the one or more regions.

In an embodiment of the present disclosure, the first weight values can be broadcast to the user equipment by the satellite, or may be determined by the user equipment according to the received target information.

Step 605, the user equipment determines second weight values corresponding to the signal quality parameter.

Step 606, the user equipment determines product values of the signal quality parameter values and the second weight values.

Step 607, the user equipment performs cell selection or cell reselection according to the first weight values and/or the product values.

Step 607 can also be replaced by step 607' (not shown in FIG. 8).

Step 607', the user equipment performs the cell selection or the cell reselection according to the first weight values, the product values, and at least one other parameter.

The at least one other parameter includes but is not limited to a moving speed parameter of the user equipment, a moving speed parameter of the satellite, a moving direction parameter of the user equipment, and a moving direction parameter of the satellite.

In an optional embodiment, step 601 and step 602 above can be replaced by step 601' when other steps remain unchanged. In step 601', at least one satellite sends the target information to the user equipment (not shown in FIG. 8).

The at least one satellite can send the target information to the user equipment by periodically broadcasting a first system message carrying the target information. The first system message here can be a minimum SI or other SI.

In the above embodiments, while ensuring the communication quality, the cell selection or the cell reselection is performed at least according to the dwell time defining when cells of the at least one satellite dwell in one or more regions, with high availability. The present disclosure also provides an embodiment of a satellite communication apparatus corresponding to the embodiment of the above satellite communication method.

Figure 9:
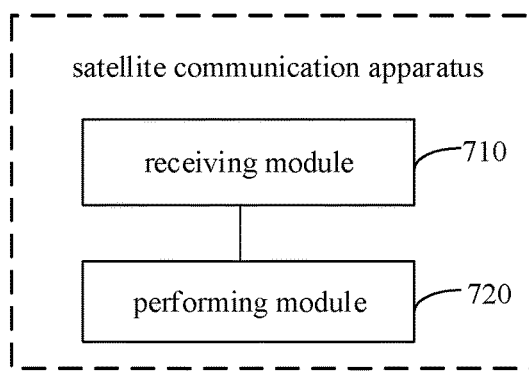
FIG. 9 is a block diagram illustrating a satellite communication apparatus according to an exemplary embodiment.

As illustrated in FIG. 9, FIG. 9 is a block diagram illustrating a satellite communication apparatus according to an exemplary embodiment, the apparatus is implemented by a user equipment, including:
a receiving module 710, configured to receive target information sent by at least one satellite; in which, the target information at least includes dwell time defining when cells of the at least one satellite dwell in one or more regions; and
a performing module 720, configured to perform cell selection or cell reselection at least based on the target information.

Figure 10:
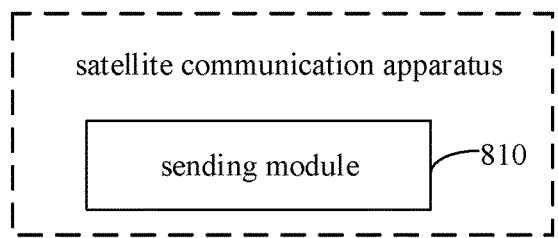
FIG. 10 is a block diagram illustrating a satellite communication apparatus according to another exemplary embodiment.

As illustrated in FIG. 10, FIG. 10 is a block diagram illustrating a satellite communication apparatus according to another exemplary embodiment, the apparatus is implemented by a user equipment, including:
a sending module 810, configured to send target information; in which, the target information at least includes dwell time defining when cells of the at least one satellite dwell in one or more regions.

For the device embodiments, it basically corresponds to the method embodiments, so relevant contents may refer to the partial description of the method embodiments. The device embodiments described above are only exemplary, in which the units described as separate components can be or cannot be physically separated, and the components displayed as units can be or cannot be physical units, that is, they can be located in one place, or they can be distributed to multiple network units. Some or all of the modules can be selected according to actual needs to achieve the purpose of the disclosed solution. Those skilled in the art can understand and implement without paying creative labor.

The technical solution provided by the embodiments of the present disclosure can include the following beneficial effects:

In the embodiments of the present disclosure, the user equipment can receive the target information sent by the at least one satellite, the target information at least includes the dwell time defining when the cells of the at least one satellite dwell in one or more regions. Furthermore, the user equipment can at least perform the cell selection or the cell reselection based on the received target information. In the embodiments of the present disclosure, the user equipment realizes the purpose of cell selection or cell reselection based on the dwell time defining when the cells of the at least one satellite dwell in one or more regions during satellite communication.

In the embodiments of the present disclosure, the user equipment can receive the first system message carrying the target information broadcast by at least one satellite, or the user equipment can send the request message to request to obtain the target information, further, the user equipment can receive the second system message carrying the target information sent by the at least one satellite through unicast signaling based on the request message, or receive the second system message carrying the target information broadcast by the at least one satellite through unicast signaling. The purpose of receiving the target information sent by at least one satellite is realized. Subsequently, the user equipment can select cells or reselect cells according to the received target information, with high availability.

In the embodiments of the present disclosure, the user equipment can perform cell selection or cell reselection of the cells of the at least one satellite at least based on the signal quality parameter and the target information. While ensuring the cell signal quality, the user equipment realizes the purpose of cell selection or cell reselection based on the dwell time defining when the cells of the at least one satellite dwell in one or more regions.

In the embodiments of the present disclosure, the at least one cell whose value of the signal quality parameter is greater than the preset value can be determined from the cells of at least one satellite as at least one candidate cell. Furthermore, cell selection or cell reselection of the at least one candidate cell can be performed at least based on the target information to ensure the communication quality.

In the embodiments of the present disclosure, the first weight values corresponding to the dwell time defining when the cells of the at least one satellite dwell in one or more regions can be determined, so as to perform cell selection or cell reselection at least according to the first weight values and the signal quality parameter, with simple implementation and high availability.

In the embodiments of the present disclosure, the user equipment can perform cell selection or cell reselection in the cells of at least one satellite at least based on the signal quality parameter, the received target information, and at least one other parameter. The user equipment can comprehensively consider the influence of various factors when selecting cells or reselecting cells, so that the final selected cell is more reasonable.

Accordingly, the present disclosure also provides a computer-readable storage medium, which stores a computer program for executing any of the satellite communication methods performed at the user equipment side.

Accordingly, the present disclosure also provides a computer-readable storage medium, which stores a computer program for executing any of the satellite communication methods performed at the satellite side.

Accordingly, the present disclosure also provides a satellite communication device, including:

a processor; and a memory configured to store computer programs;

in which, the processor is configured to implement the computer programs to implement the satellite communication method performed at the user equipment side.

Figure 11:
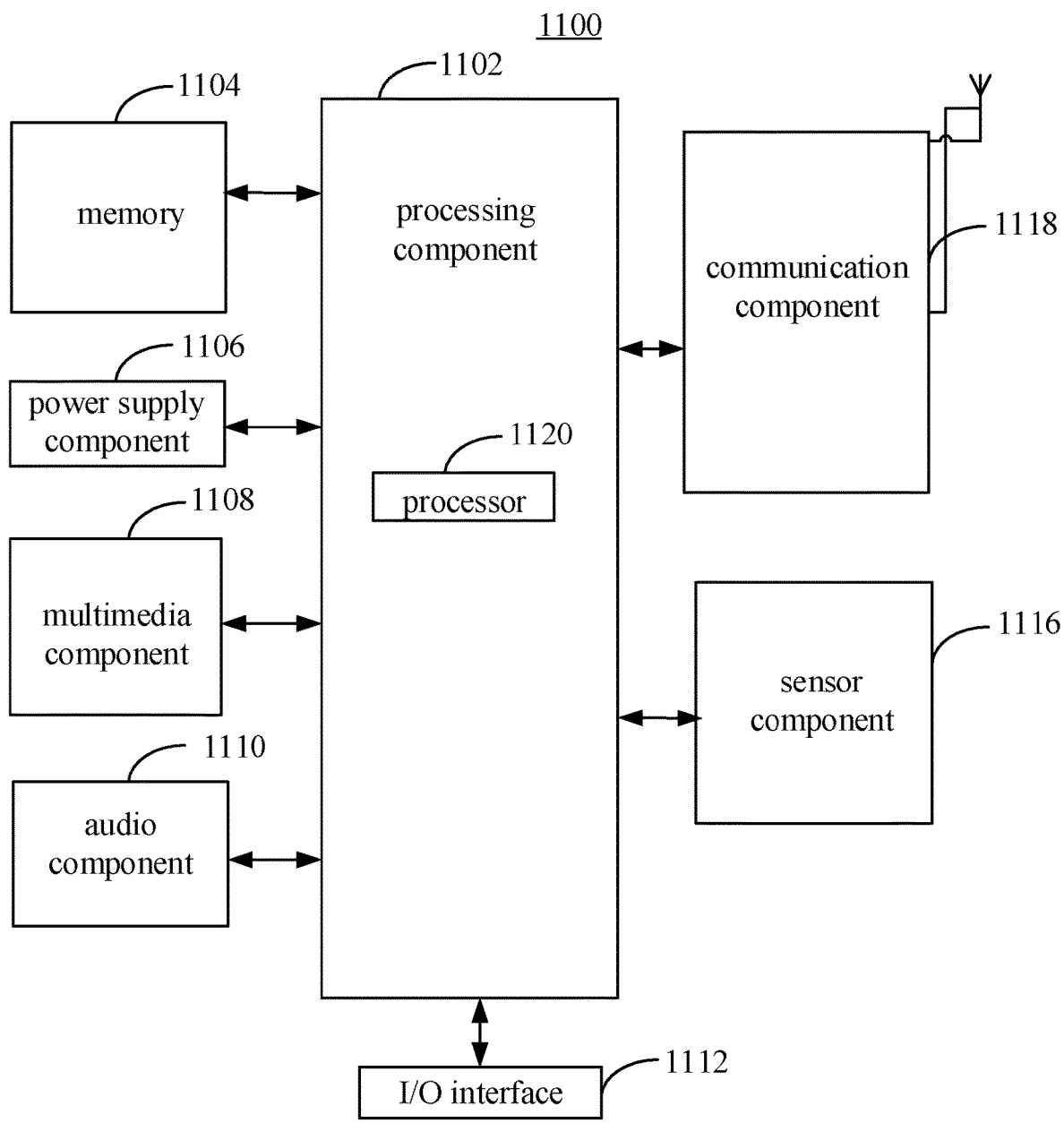
FIG. 11 is a schematic diagram illustrating a satellite communication device according to an exemplary embodiment.

FIG. 11 is a schematic diagram illustrating an electronic device 1100 according to an exemplary embodiment. For example, the electronic device 1100 may be terminals such as a mobile phone, a tablet personal computer, an ebook reader, a multimedia playback device, a wearable device, a vehicle-mounted terminal, an ipad, a smart TV, and so on.

Referring to FIG. 11, the electronic device 1100 may include one or more components of the followings: a processing component 1102, a memory 1104, a power supply component 1106, a multimedia component 1108, an audio component 1110, an input/output (I/O) interface 1112, a sensor component 1116, and a communication component 1118.

The processing component 1102 generally controls the whole operation of the electronic device 1100, such as the operations related to display, phone call, data communication, camera operation and recording operation. The processing component 1102 may include one or more processors 1120 to perform instructions, to complete all or part of steps of the above satellite communication method. In addition, the processing component 1102 may include one or more modules for the convenience of interaction between the processing component 1102 and other components. For example, the processing component 1102 may include a multimedia module for the convenience of interaction between the multimedia component 1108 and the processing component 1102. For another example, the processing component 1102 may read executable instructions from the memory to realize the steps of the satellite communication method provided by the above embodiments The memory 1104 is configured to store various types of data to support the operation of the electronic device 1100. Examples of the data include the instructions of any applications or methods operated on the electronic device 1100, contact data, phone book data, messages, pictures, videos, etc. The memory 1104 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1106 may provide power for various components of the electronic device 1100. The power supply component 1106 may include a power supply management system, one or more power supplies, and other components related to generating, managing and distributing power for the electronic device 1100.

The multimedia component 1108 includes a screen provided an output interface between the electronic device 1100 and the user. In some embodiments, the multimedia component 1108 includes a front camera and/or a rear camera. When the electronic device 1100 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 1110 is configured to output and/or input an audio signal. For example, the audio component 1110 includes a microphone (MIC). When the electronic device 1100 is in an operation mode, such as a call mode, a record mode, and a speech recognition mode, the microphone is configured to receive an external audio signal. The received audio signal may be further stored in the memory 1104 or sent via the communication component 1116. In some embodiments, the audio component 1110 further includes a speaker configured to output an audio signal.

The I/O interface 1112 provides an interface for the processing component 1102 and the peripheral interface module, and the peripheral interface module may be a keyboard, a click wheel, a button, etc. The button may include is but not limited to a home button, a volume button, a start button and a lock button.

The sensor component 1116 includes one or more sensors, configured to provide various aspects of status assessment for the electronic device 1100. For example, the sensor component 1116 may detect the on/off state of the electronic device 1100 and the relative positioning of the components. For example, the components are a display and a keypad of the electronic device 1100. The sensor component 1116 may further detect the location change of the electronic device 1100 or one component of the electronic device 1100, the presence or absence of contact between the user and the electronic device 1100, the orientation or acceleration/deceleration of the electronic device 1100, and the temperature change of the electronic device 1100. The sensor component 1116 may include a proximity sensor configured to detect the existence of the objects nearby without any physical contact. The sensor component 1116 may further include a light sensor such as a complementary metal oxide semiconductor (CMOS) or a charge-coupled device (CCD) image sensor, which is configured to use in imaging applications. In some embodiments, the sensor component 1116 may further include an acceleration transducer, a gyroscope sensor, a magnetic sensor, a pressure sensor or a temperature sensor.

The communication component 1118 is configured for the convenience of wire or wireless communication between the electronic device 1100 and other devices. The electronic device 1100 may access wireless networks based on communication standard, such as Wi-Fi, 2G, 3G, 4G, 5G, or 6G, or their combination. In an embodiment, the communication component 1118 receives broadcast signals or from an external broadcast management system broadcast related information via a broadcast channel. In an embodiment, the communication component 1118 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the electronic device 1100 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 1104 including instructions, the instructions may be executed by the processor 1120 of the electronic device 1100 to complete the above satellite communication methods. For example, the non-transitory computer-readable storage medium may be a ROM, a random access memory (RAM), a CD-ROM, a magnetic tape, a floppy disk, an optical data storage device, etc.

Accordingly, the present disclosure also provides a satellite communication device, including:
a processor; and
a memory configured to store computer programs;
in which, the processor is configured to implement the computer programs to implement the satellite communication method performed at the satellite side.

Figure 12:
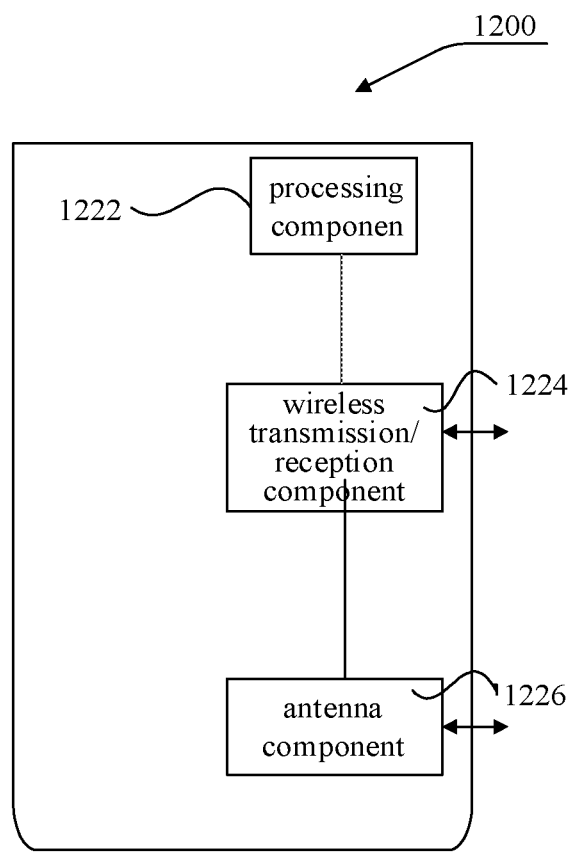
FIG. 12 is a schematic diagram illustrating a satellite communication device according to another exemplary embodiment.

As illustrated in FIG. 12, FIG. 12 is a schematic diagram illustrating a satellite communication device 1200 according to an exemplary embodiment. The device 1200 may be provided as a satellite. As illustrated in FIG. 12, the device 1200 includes a processing component 1222, a wireless transmission/reception component 1224, an antenna component 1226, and a signal processing section specific to a wireless interface. The processing component 1222 may further include one or more processors.

One of the processors in the processing component 1222 may be configured to perform any of the satellite communication methods described at the satellite side.

After considering the specification and practicing the disclosure herein, those skilled in the art will easily think of other implementations of the disclosure. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A satellite communication method, performed by a user equipment and comprising:
receiving target information sent by at least one satellite;
wherein, the target information comprises dwell time defining when cells of the at least one satellite dwell in one or more regions, wherein the target information is implemented by a correspondence between region identifiers and dwell time defining when the cells of the at least one satellite exist in the one or more regions; and
performing cell selection or cell reselection at least based on the target information.

2. The method as claimed in claim 1, wherein receiving the target information sent by at least one satellite comprises:
receiving a first system message carrying the target information, wherein the first system message is broadcast by the at least one satellite.

3. The method as claimed in claim 1, further comprising:
sending a request message; wherein the request message is configured to request to obtain the target information;
wherein receiving the target information sent by the at least one satellite comprises:
receiving a second system message carrying the target information, wherein the second system message is:
sent to the user equipment based on the request message by the at least one satellite through unicast signaling, or broadcast by the at least one satellite based on the request message.

4. The method as claimed in claim 1, wherein performing cell selection or cell reselection at least based on the target information comprises:
performing the cell selection or the cell reselection of the cells of the at least one satellite at least based on a signal quality parameter and the target information.

5. The method as claimed in claim 4, wherein performing the cell selection or the cell reselection of the cells of the at least one satellite at least based on the signal quality parameter and the target information comprises:
determining at least one cell with a value of the signal quality parameter greater than a preset value of the cells of the at least one satellite as at least one candidate cell; and
performing the cell selection or the cell reselection of the at least one candidate cell at least based on the target information.

6. The method as claimed in claim 4, wherein performing the cell selection or the cell reselection of the cells of the at least one satellite at least based on the signal quality parameter and the target information comprises:
determining first weight values corresponding to the dwell time defining when the cells of the at least one satellite dwell in the one or more regions; and
performing the cell selection or the cell reselection at least based on the first weight values and the signal quality parameter.

7. The method as claimed in claim 6, wherein performing the cell selection or the cell reselection of the cells of the at least one satellite at least based on the first weight values and the signal quality parameter comprises:
determining second weight values corresponding to the signal quality parameter;
determining product values of values of the signal quality parameter and corresponding second weight values; and
performing the cell selection or the cell reselection at least based on one or both of the first weight values and the product values.

8. The method as claimed in claim 4, wherein performing the cell selection or the cell reselection of the cells of the at least one satellite at least based on the signal quality parameter and the target information comprises:

performing the cell selection or the cell reselection satellite at least based on the signal quality parameter, the target information and at least one other parameter.

9. The method as claimed in claim 6, wherein determining first weight values corresponding to the dwell time defining when the cells of the at least one satellite dwell in the one or more regions comprises:
receiving the first weight values broadcast by the at least one satellite; or
determining the first weight values at least according to the dwell time defining when the cells of the at least one satellite dwell in the one or more regions.

10. A satellite communication method, performed by a satellite and comprising:
sending target information; wherein, the target information at least comprises dwell time defining when cells of the at least one satellite dwell in one or more regions, wherein the target information is implemented by a correspondence between region identifiers and dwell time defining when the cells of the at least one satellite exist in the one or more regions.

11. The method as claimed in claim 10, wherein sending the target information comprises:
broadcasting a first system message carrying the target information.

12. The method as claimed in claim 11, further comprising:
receiving a request message sent by at least one user equipment; wherein, the request message is configured to request to obtain the target information;
wherein sending the target information comprises:
sending a second system message carrying the target information
to the at least one user equipment based on the request message through unicast signaling, or based on the request message.

13. The method as claimed in claim 10, further comprising:
broadcasting first weight values corresponding to the dwell time defining when the cells of the at least one satellite dwell in the one or more regions.

14. A non-transitory computer-readable storage medium having computer programs stored thereon, wherein, the computer programs are configured to perform a satellite communication method as claimed in claim 1.

15. A user equipment, comprising:
a processor; and
a memory configured to store computer programs;
wherein the processor is configured to implement the computer programs to implement a satellite communication method, the method comprising:
receiving target information sent by at least one satellite; wherein, the target information at least comprises dwell time defining when cells of the at least one satellite dwells in one or more regions, wherein the target information is implemented by a correspondence between region identifiers and dwell time defining when the cells of the at least one satellite exist in the one or more regions; and
performing cell selection or cell reselection at least based on the target information.

16. A satellite, comprising:
a processor; and
a memory configured to store computer programs;
wherein the processor is configured to implement the computer programs to implement the satellite communication method as claimed in claim 10.

17. The method as claimed in claim 7, wherein determining first weight values corresponding to the dwell time defining when cells of the at least one satellite dwells in the one or more regions comprises:
receiving the first weight values broadcast by the at least one satellite; or
determining the first weight values at least according to the dwell time defining when cells of the at least one satellite dwells in the one or more regions.

18. The method as claimed in claim 8, wherein determining first weight values corresponding to the dwell time defining when cells of the at least one satellite dwells in the one or more regions comprises:
receiving the first weight values broadcast by the at least one satellite; or
determining the first weight values at least according to the dwell time defining when cells of the at least one satellite dwells in the one or more regions.

19. The user equipment as claimed in claim 15, wherein receiving the target information sent by at least one satellite comprises:
receiving a first system message carrying the target information, wherein the first system message is broadcast by the at least one satellite.

20. The user equipment as claimed in claim 15, wherein the method further comprises:
sending a request message; wherein the request message is configured to request to obtain the target information;
wherein receiving the target information sent by the at least one satellite comprises:
receiving a second system message carrying the target information, wherein the second system message is sent to the user equipment based on the request message by the at least one satellite through unicast signaling; or
receiving a second system message carrying the target information, wherein the second system message is broadcast by the at least one satellite based on the request message.

* * * * *